United States Patent [19]

Frankum

[11] Patent Number: 5,278,732

[45] Date of Patent: Jan. 11, 1994

[54] BICYCLE WHEEL PORTABLE LIGHT AND REFLECTOR

[76] Inventor: John Frankum, 1641 Edleshearan Rd., Lake Mary, Fla. 32746

[21] Appl. No.: 963,770

[22] Filed: Oct. 20, 1992

[51] Int. Cl.$^5$ .............................................. B62J 6/00
[52] U.S. Cl. ...................................... 362/72; 362/78; 362/276
[58] Field of Search ................... 362/72, 78, 157, 191, 362/276, 802, 299, 307, 308, 158

[56] References Cited

U.S. PATENT DOCUMENTS

| | | | |
|---|---|---|---|
| 2,811,633 | 10/1957 | Bjork | 362/72 |
| 3,714,412 | 1/1973 | Franklin | 362/158 |
| 4,135,229 | 1/1979 | Mordurkay | 362/78 |
| 4,787,014 | 11/1988 | Wodder et al. | 362/78 |
| 4,796,972 | 1/1989 | Thomas et al. | 362/72 |
| 4,800,469 | 1/1989 | Leon | 362/78 |
| 4,847,735 | 7/1989 | Kawasaki | 362/78 |
| 4,867,727 | 9/1989 | Lanius | 362/802 |
| 5,121,305 | 6/1992 | Deed et al. | 362/72 |

Primary Examiner—Richard R. Cole
Attorney, Agent, or Firm—Allen, Dyer, Doppelt, Franjola & Milbrath

[57] ABSTRACT

A portable light and reflector for use on the spoke of a bicycle wheel or on other similar vehicles uses a centrifugal switch to complete an electrical circuit between a light source and power source. The centrifugal switch responds to the centrifugal force occurring from the rotation of the wheel. The centrifugal switch, power source and lighting circuitry is mounted within a water tight chamber of the light and reflector housing. The housing contains both translucent and reflective surfaces to take advantage to light incident upon the reflector from outside sources as well as transmitting light and reflecting light from the light source provided. The portable light and reflector disclosed use an LED and lithium battery and is has an easy method for assembling and attaching the housing to the spoke of the bicycle wheel.

20 Claims, 2 Drawing Sheets

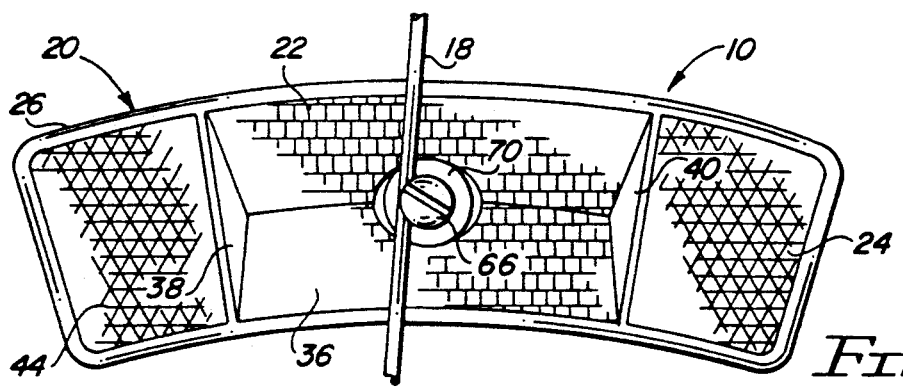
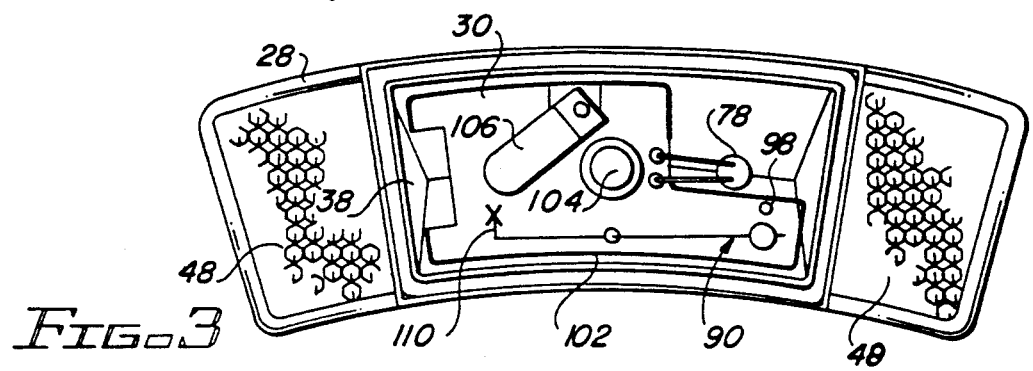
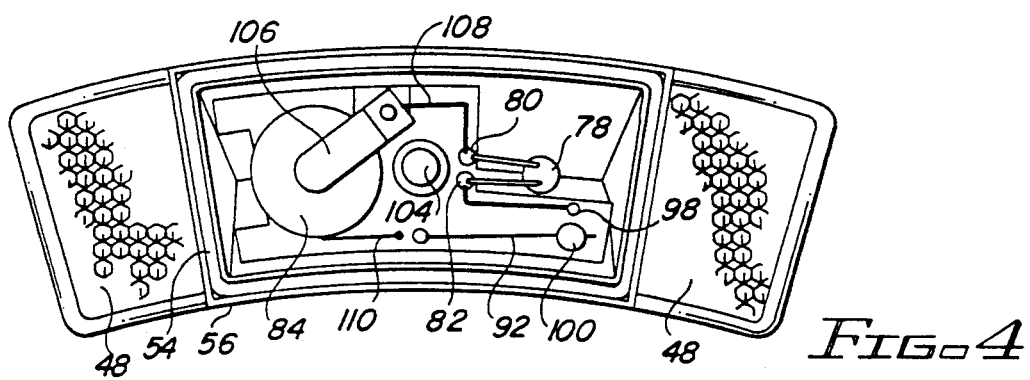
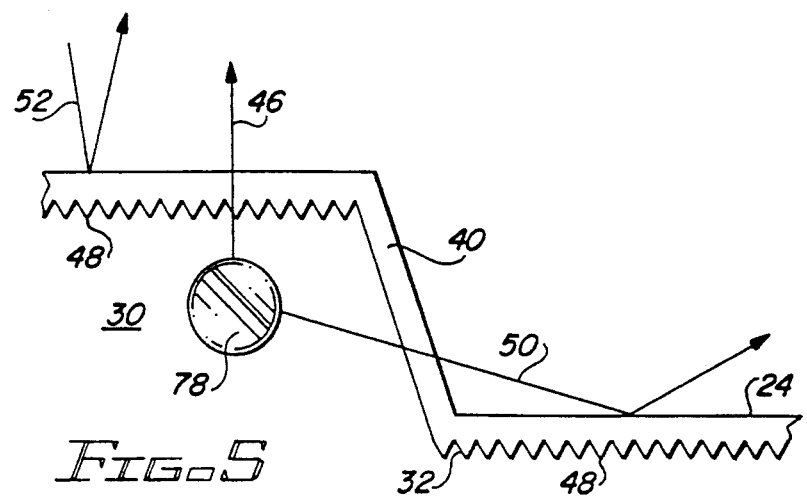

BICYCLE WHEEL PORTABLE LIGHT AND REFLECTOR

1. FIELD OF THE INVENTION

The invention relates to a light and reflector for use in combination with a bicycle wheel and other small vehicles and makes use of the centrifugal force generated from the rotation of the bicycle wheel for switching the light on during use.

2. BACKGROUND OF THE INVENTION

Lights, warning lights and reflectors for use on bicycles and other vehicles are well known and have been widely used for years in promoting safe driving habits during dark or dimly lit driving conditions. Reflectors of varying colors have been placed on bicycles to reflect the lights from approaching vehicles. The reflectors have been mounted on the fenders, seats, pedals, handle bars and on as many surfaces as possible so that approaching vehicles can see that the bicycle is present and in the interest of safety, avoid an unwanted accident. Reflectors placed on the spokes of bicycle wheels are effective in not only the light that is reflected but in the circular motion that is distinctive of a traveling bicycle. Lights as well as reflectors have been adapted to the rotating wheel for the same reason. Emitting light in the distinctive rotational manner is an excellent indicator to approaching vehicles that a bicycle is present. Should the approaching vehicle or conditions fail to provide sufficient light to reflect off of the bicycle or any reflector on the bicycle, light emanating directly from the bicycle will eliminate that need.

Reflectors typically use mirrored surfaces or multi-faceted lenses to reflect incident light. Lights typically use mirrored surfaces and direct the beam of light outward toward the direction preferred depending on the placement of the light on the bicycle and the optimum direction sought for giving notice to any oncoming vehicles. Power for the light source has been provided by mounting a battery within the light housing and by the use of hub mounted generators and wire leads connected to from the generator to the light source. Combinations of a light and reflector have been incorporated into a spoke mounted assembly. Switches have been added to the lighting circuits that require a positive manual action to switch the light on and off when needed. Centrifugal switches have also been incorporated into circuitry that uses the centrifugal force of the rotation wheel. The inherent objective or goal is to provide a warning and visual indication to oncoming vehicles that a bicycle is near and that safety be a prime consideration.

U.S. Pat. No. 4,135,229 (Safety Device for Use on a Bicycle Wheel) issued to Modurkay on Jan. 16, 1979 discloses a combination of reflector and light for mounting on the spokes of a bicycle wheel includes the use of a battery clamped to the wheel hub. A socket receiving an electric light bulb is mounted within a housing having transmissive side walls and means for clamping the housing to spokes of the wheel with the light transmissive side walls facing laterally away from the wheel. The means for electrically connecting the light bulb socket in series with the battery includes a switch that enables one to turn off the light when it is not needed, thereby conserving the battery.

U.S. Pat. No. 4,796,972 (Illuminated Spoke Mounted Reflector for Bicycles) issued to Thomas et al. on Jan. 10, 1989 discloses a rotary electrical contact assembly that is mounted on the axle of a bicycle wheel. The rotary electrical contact assembly provides power from a conventional bicycle generator to light bulbs within reflectors mounted on the spokes of the bicycle wheel. A slidable switch on the rotary electrical contact assembly is connected to a shift cable for remote manual actuation by the bicycle rider. A constant or flashing mode operation can be selected.

U.S Pat. No. 4,787,014 (Spoke Mounted Bicycle Light) issued to Wodder et al. on Nov. 22, 1988 discloses a safety lighting device containing a self contained light source that is removably secured to the spoke of a wheel. The patent points out the excessive amount of night time fatalities that result from collisions between automobiles and young riders under the age of 14. Also pointed out is the fact that reflectors alone have limited distances in which they can be effective and typically lights provide only thin beams. It goes on to state how the use of generators are often unreliable, relatively expensive, and undesirable for use by these younger riders due to the drag that is placed on the wheel. In essence, the patent expresses the need for a low cost bicycle safety light which renders the cyclist highly visible to motorists, which is easy to install and maintain, and which will be accepted for long term use by younger riders.

U.S. Pat. No. 4,176,390 (Light) issued to Galbert on Nov. 27, 1979 discloses a light that is mounted to the spoke of a bicycle wheel. The light turns off automatically when the bicycle is not being ridden, and turns on automatically in response to centrifugal force when the bicycle is being ridden. A light bulb is affixed to the wheel in a manner that orients the light's battery on an axis positioned radially or the wheel and that orients the light's battery radially inward of the light's bulb. A switch spring is provided that normally biases the battery out of electrical contact with the bulb when the wheel is not rotating, but which permits the battery to be biased into electrical contact with the bulb in response to centrifugal force when the wheel is rotating and thus turn on the light.

U.S. Pat. No. 5,016,144 (Illuminating Wheel Covers) issued to DiMaggio on May 14, 1991 discloses a rotating mercury switch which gathers mercury during rotation and causes a momentary electrical contact. Light emitting diodes (LED) are arranged in an array and activated by the mercury switch. A 9 volt battery is used as the power source for what is described as a unique and improved illumination wheel cover using advanced electronics to illuminate light emitting diodes, aesthetically arranged to create an illusionary effect.

SUMMARY OF THE INVENTION

The present invention contemplates the use of a portable light and reflector for use on a bicycle wheel or similar vehicle wheel as a safety device giving notice to approaching vehicles during evening and dimly lighted hours, the most dangerous driving time for bicycle riders. In particular, the light source makes use of a centrifugal switch for turning on the light when the bicycle wheel is in rotation.

The invention includes a housing having a central portion and two end portions in a preferred embodiment. The central portion includes at least one translucent panel that permits light from a light source to penetrate the housing and be emitted for clear view from approaching vehicles. The emitted light is also permitted to reflect off of the reflective end portions. Incident light from other sources, automobile headlights as one example, is also reflected. The housing contains a chamber in which a light source is positioned. The light source emits light through the translucent panels of the housing and across reflective surfaces of the housing. The reflective surfaces are created through the use of a multiplicity of prisms located on the inner surfaces of the housing. Means for mounting the light within the chamber is provided.

The housing has a first shell and a substantially similar second shell that are sealed together to form the chamber in which the light source is located. In addition, a power source and centrifugal switch are also located within the chamber. The power source may vary but are compatible with each other. A circuit board is provided for mounting the power source, light source and switch. The entire housing assembly is mounted onto a spoke of the bicycle wheel. By the simple rotation of the bicycle wheel, the centrifugal switch closes a circuit between the power source and light source allowing the translucent and reflective elements of the housing to transmit light. A light emitting diode (LED) is used for the light source in one embodiment along with a lithium battery. In a preferred embodiment, a flashing LED is used.

The centrifugal switch comprises an elongated arm with a weight affixed to a distal end. A proximal end of the elongated arm is affixed to the circuit board. The elongated arm is selected to be electrically conductive and to have a tensile characteristic to be sensitive to typical centrifugal forces occurring during typical bicycle speeds and rotations of a bicycle wheel. The elongated arm is positioned on the circuit board in such a manner that the distal end makes contact with a contact post of the centrifugal switch during rotation of the wheel. This contact closes the circuit between the light source and power source yielding light.

The shape of the housing may vary. In the preferred embodiment, the light source is located approximately the center of the chamber formed by bring the similar housing shells together. The shells are held together using a nut and bolt arrangement that biases the shells together against a seal and affixes the housing to a single spoke of the wheel.

BRIEF DESCRIPTION OF DRAWINGS

A preferred embodiment of the invention is described by way of example with reference to the accompanying drawings in which:

FIG. is a side view of a bicycle wheel showing locations of the light and reflector on spokes of the wheel;

FIG. 2 is a front view of the light and reflector affixed to the spoke of the bicycle wheel, reflective and translucent surfaces have been identified along with the means for affixing the housing to the spoke;

FIG. 3 is a side view of the light and reflector in an open position showing the switching device, light source and battery clip mounted on a circuit board, inner surfaces containing a multiplicity of prisms is detailed;

FIG. 4 is a view similar to that shown in FIG. 3, a battery is shown in typical position;

FIG. 5 is a partial cross-sectional side view of the housing shell indicating translucent and reflective surfaces;

FIG. s is a partial cross-sectional side view of the centrifugal switch mounted to the circuit board.

DETAILED DESCRIPTION OF PREFERRED EMBODIMENT

Figure 1:
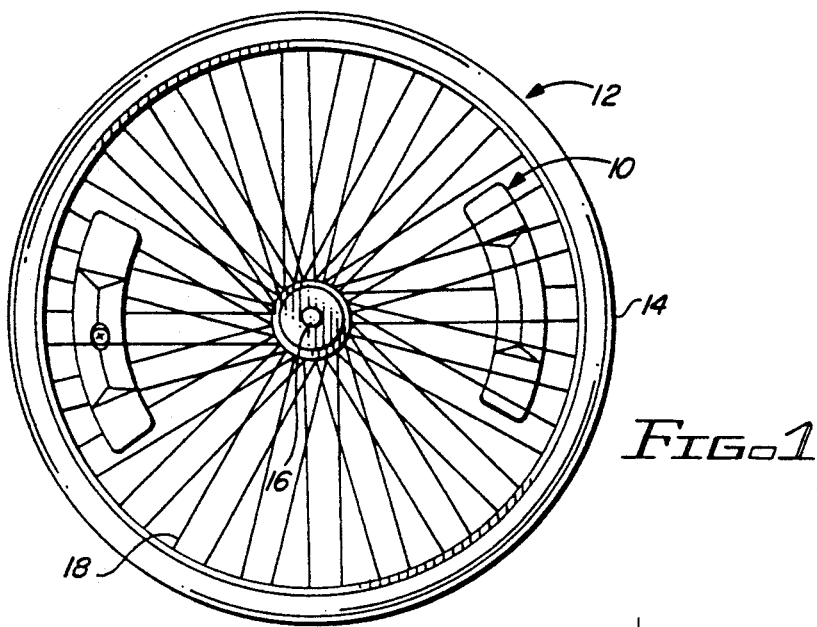
Figure 6:
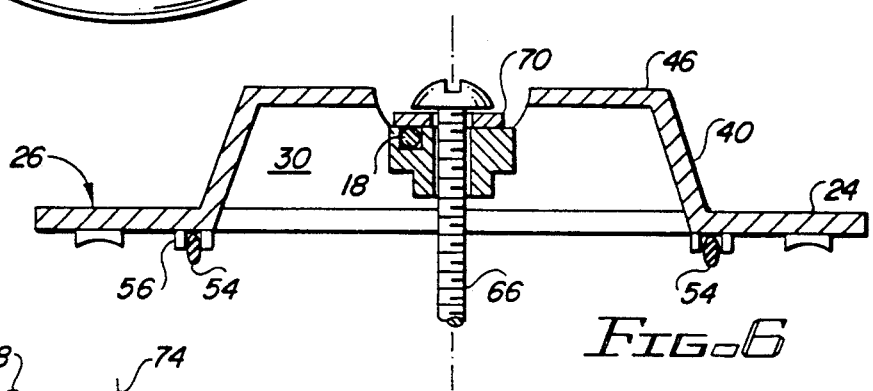
FIG. 6 is a partial cross-sectional view of the housing shell describing the means for affixing the shells together and to the spoke, a seal is shown.

The preferred embodiment for a portable light and reflector 10 is herein disclosed. The portable light and reflector 10 is affixed to a spoke 18 of a bicycle wheel 12 between a hub 16 and a rim 14 in a preferred location proximate to the rim 14 as indicated in FIG. 1. A housing 20 of the portable light and reflector 10 comprises two similar shaped shells, a first shell 26 and a second shell 28. The shells 26 and 28 are fitted together to form the housing 20 of the portable light and reflector 10 shown in FIG. 2. The shells 26 and 28 are held together by the use of a nut 68 and bolt 66 arrangement passing through the housing 20 and biasing the first shell 26 against the second shell 28. The same nut 68 and bolt 66 arrangement is used to affix the housing to the spoke 18 of the bicycle wheel 12. The first shell 26 contains a slot 76 sufficiently close to a bolt axis 74 so as to allow a washer 70 to be placed over the slot 76 and bias the washer 70 against the spoke 18 located within the slot 76. This arrangement is shown in FIG. 1 and FIG. 2 of the drawings. FIG. 6 contains additional detail on affixing the housing 20 to the spoke 18.

The housing 20 formed by bringing the first shell 26 and the second she)1 28 together contains inner surfaces 32 and outer surfaces 34. The housing 20 is made of a translucent material which permits light to pass. By adding a multiplicity of prisms 48 to an inner surface 32, the corresponding outer surface 34 is made to be highly reflective to externally incident light 52 while continuing to allow emitted light 46 to be transmitted from an inner surface 32 to the outer surface 34 and in view of approaching vehicles. The housing 20 can be made to take on various shapes. In the preferred embodiment, the housing 20 contains a central portion 22 with end portions 24 and 44 on two sides of the central portion 22. The shape of the shells 26 and 28 is formed by joining two center inclined plane sections 36 and two side faces, a left side face 38 and a right side face 40. The surfaces of these side faces 38 and 40 are smooth to allow light to be efficiently transmitted through the faces. Light emitted 50 from the light source 78 passes through these side faces and reflects off of the reflective surfaces of the housing end portions 24 to provide reflected light as well as transmitted light from the light source. FIG. 2, FIG. 3 and FIG. 4 show the various surfaces of the housing 20 in both an open and closed configuration. FIG. 5 is a functional view of the light source 78 and light transmitted 46 and reflected 50 from the light source 78.

The light source 78 is located between the first shell 26 and the second shell 28 within a chamber 30 formed by affixing the shells together to form the housing 20. The power source 84 and centrifugal switch 90 are mounted on a printed circuit board 102 along with the light source 78. The printed circuit board 102 is fixed between the shells 26 and 28 of the housing 20. The bolt axis 74 passes through a hole 104 in the printed circuit board 102. The printed circuit board 102 is mounted between center mounting posts 58 of the shells 26 and 28. The power source 84 is fastened to the printed circuit board 102 through the use of a battery clip 106 that permits easy installation and removal of the power source 84. Electrical contacts between the power source 84, the light source 78 and the centrifugal switch 90 can be wires or electrical paths 110 affixed to the printed circuit board 102 as is traditionally done and as is done in the preferred embodiment.

In the preferred embodiment, the power source 84 is a lithium battery and the light source 78 is a light emitting diode (LED). In the preferred embodiment, the LED can be a flashing or constant output LED. The flashing LED allows for longer life of the lithium battery by compromising light output. The safety features of the portable light and reflector are not compromised by the use of the flashing LED.

Figure 7:
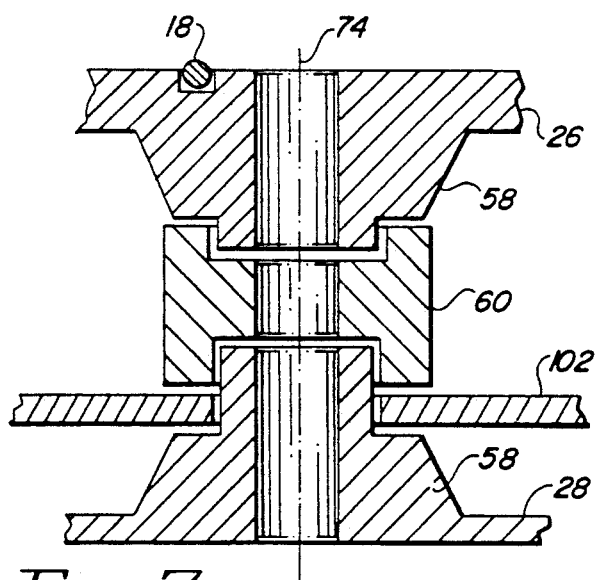
FIG. 7 is a partial cross-sectional view further detailing the housing and shows the circuit board mounting and seal along a bolt penetration in the housing.
Figure 9:
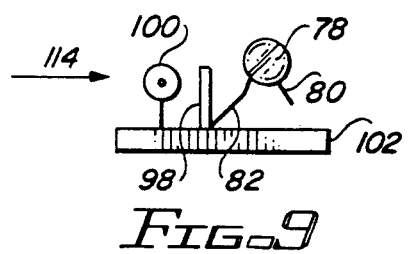
FIG. 9 is a partial cross-sectional end view of the centrifugal switch mounted to the circuit board.
Figure 8:
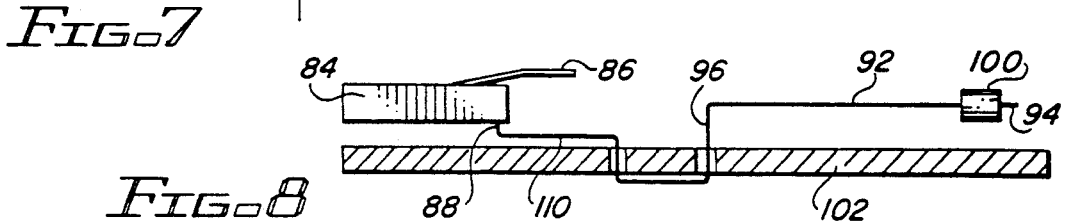

The chamber 30 is made to be water tight by using a seal 54 in a groove 56 running along the perimeter of the shells 26 and 28 where the shells are brought together. In addition to the seal 54 and groove 56 arrangement in the preferred embodiment, a rubber washer 60 is placed between the center mounting posts 58 in order to provide a water tight arrangement along the bolt axis 74. This arrangement is identified in FIG. 6 and FIG. 7 of the drawings.

The centrifugal switch 90 (illustrated in FIG. 3, 4, 8, and 9) responds to the centrifugal 114 force occurring during the rotation of the bicycle wheel 12. The centrifugal switch 90 in the preferred embodiment has an elongated arm 92 described as having a proximal end 96 and a distal end 94. The distal end 94 has a weight 100 attached. The proximal end 92 is affixed to the printed circuit board 102 in such a way so as to allow the elongated arm 92 to rotatably move about the distal end 94 in response to the centrifugal force 114 occurring during rotation of the bicycle wheel 12. The distal end 96 penetrates the printed circuit board 102 in the preferred embodiment and is affixed at the distal end 94 using soldering points. The elongated arm 92 is held above the printed circuit board 102 so as to permit the weight 100 to move freely in response to the centrifugal force 114 placed upon it. The centrifugal force 114 causes the electrically conductive elongated arm 92 to temporarily affix to a contact post 98 which is electrically connected to the light source 78 at a second contact 82 of the light source 78 and complete the circuit between the light source 78 and the power source 84 causing light to be emitted. The tensile characteristics, length and weighted end of the elongated arm 92 can vary but are selected through experimentation with various embodiments. The location of the elongated arm 92 and contact post 98 on the printed circuit board 102 and the position of the printed circuit board 102 relative to the radial axis of the wheel 12 provides an optimum response of the centrifugal switch 90 to the centrifugal force 114. Placement of the portable light and reflector 10 on the spoke 18 in the slot 76 provided, automatically place the centrifugal switch 90 in its optimum location relative to the radially outward centrifugal force 114 occurring as a result of wheel 12 rotation. In the preferred embodiment, a location on the spoke 18 close to the rim 14 will yield optimum switch performance.

Although the preferred embodiment has been presented, it is believed that those skilled in the art of making and using reflectors and lights for bicycle wheels and similar vehicles can devise other embodiments with combinations of elements disclosed.

What is claimed is:

1. A portable light and reflector suitable for mounting on a bicycle or similar vehicle, comprising:
   a housing having a central portion and two end portions having reflective surfaces each on an opposite side of said central portion, said central portion including at least one translucent panel which faces a corresponding reflective panel of said end portion;
   means within said central portion for emitting light through said translucent panel and across said reflective surfaces; and
   means for mounting said light and reflector on a vehicle.

2. A portable light and reflector recited in claim 1 wherein said reflective surface of each said end portion is translucent and comprises an inner surface having a pattern of multiple prisms formed across said inner surface.

3. A portable light and reflector suitable for mounting on a bicycle or similar vehicle, comprising:
   a housing having a first shell and a substantially similar second shell fixed together to form a chamber, each of said first and second shells having an inner surface and an outer surface, each of said shells being substantially translucent, and at least a portion of said outer surface being reflective;
   means for fixing said first and second shells together with a spoke of a bicycle wheel at a point between a rib and a hub of said wheel;
   a light source having first and second contacts located within said chamber;
   means for receiving a power source having first and second terminals, the receiving means located within said chamber;
   said first terminal of said power source receiving means electrically connected to said first contact on said light source;
   means for switching said light source from an energized state to an electrically passive state, the switching means being activated by a centrifugal force from rotation of a wheel on said bicycle or similar vehicle; and
   wherein said light source is positioned so as to transmit light through said substantially translucent housing and reflect off of said reflective outer surface of said housing.

4. A portable light and reflector recited in claim 3 wherein said switching means comprises:
   a centrifugal switch located within said chamber further comprising:
     an electrically conductive elongated arm having a proximal end and a distal end, said proximal end electrically connected a second terminal of said power source;
     a weight affixed to said elongated arm at said distal end; and
     a contact post proximate to said distal end;
     said second contact on said light source electrically connected to said centrifugal switch at said contact post; and
     means for rotatably moving said distal end of said elongated arm for making contact wit said contact post as a result of said centrifugal force occurring from rotation of a wheel of said bicycle or similar vehicle.

5. A portable light and reflector recited in claim 4 wherein said means for rotatably moving said distal end of said elongated arm to said contact post further comprises:
- a flexible spring material for said elongated arm;
- a length of said elongated, said length selected to work in conjunction tensile characteristics of said elongated arm spring material;
- a position for said contact post along an axis positioned substantially radially of wheel axis and having said weight inward of said contact post relative to said radially outward path so as to force said weighted distal end against said contact post in response to a centrifugal force occurring during rotation of said wheel; and
- a closed circuit resulting between said power source and said light source form said contact of said distal end and said contact post.

6. A portable light and reflector recited in claim 4 further comprising:
- a printed circuit board;
- means for affixing said power source to said printed circuit board;
- means for affixing said light source to said printed circuit board;
- means for affixing said elongated arm so as to be positioned proximal to and above said board and to move in a plane parallel to said board during rotation of said bicycle wheel; and
- means for affixing said printed circuit board within said housing chamber for permitting said distal end to make contact with said contact post using said centrifugal force occurring during rotation of said wheel.

7. A portable light and reflector recited in claim 3 wherein said first and second shells of said housing further comprise a seal placed between said shells so as to render said housing chamber substantially water tight.

8. A portable light and reflector recited in claim 3 further comprises;
- means for transmitting said generated light emitted from said light source;
- means for reflecting said generated light from said outer surface of said housing; and
- means for reflecting incident light from said reflector housing outer surface from an external light source.

9. A portable light and reflector recited in claim 3 wherein said means for fixing said first shell to said second shells further comprises:
- a bolt penetrating said shells so as to align said shells and affix said shells against each other;
- a nut fastened to said bolt, said nut rotated about threads of said nut to compress said shells against each other;
- a washer located between said nut on said bolt penetrating said shells; and
- a slot on an outside surface in said first shell proximal to said bolt, said spoke placed within said slot and substantially biased by said washer when said nut is rotated and biased against said washer.

10. A portable light and reflector recited in claim 3 whose means for transmitting and reflecting said generated light from said light source and reflecting incident light from an external light source comprises a multiplicity of prisms on said inner surfaces of said reflector housing, said plurality of prism surfaces causing said reflector housing to be translucent for said generated light from within said housing and substantially reflective for said external light incident upon said reflector housing.

11. A centrifugal switching device, comprising:
- a light source having a first contact and a second contact;
- a power source having a first terminal and a second terminal;
- a centrifugal switch, further comprising:
  - an elongated flexible metal arm having a proximal end and a distal end;
  - a weight affixed to said distal end;
  - a circuit board having said proximal end of said elongated arm affixed thereto; and
  - a contact post affixed to said circuit board proximate to said distal end of said elongated arm;
- means for affixing said power source to said circuit board;
- means for affixing said light source to said circuit board;
- means for connecting said first terminal of said power source to said first contact of said light source;
- means for connecting said second terminal of said power source to said proximal end of said centrifugal switch elongated arm; and
- means for connecting said second contact of said light source to said contact post of said centrifugal switch.

12. A centrifugal switching device recited in claim 11 further comprising:
- a reflector housing comprised of a first shell and a second shell attached to form a chamber within the reflector;
- means for mounting said circuit board within said chamber;
- means for sealing said first and second housing shells so as to render said chamber substantially water tight;
- means for fastening said first shell to said second shell and for affixing said reflector to a bicycle spoke between an axle and a rim of a bicycle wheel so as to permit said distal end of said elongated arm to make contact with said contact post after a centrifugal force from a rotation of said bicycle wheel acts on said weight of said elongated arm wherein said contact closes a circuit between said power source and said light source generating light from said light source;
- means for transmitting said generated light emitted from said light source;
- means for reflecting said generated light from said outer surface of said housing; and
- means for reflecting incident light from said reflector housing outer surface form an external light source.

13. A centrifugal switching device recited in claim 12 wherein said means for fastening said first shell to said second shell comprises:
- a bolt penetrating said shells so as to align said shells and affix said shells against said seal;
- a nut fastened to said bolt, said nut rotated about threads of said nut to compress said shells against said seal to form said substantially water tight chamber;
- a washer located between said nut on said bolt penetrating said shells; and
- a slot in an outside surface in said first shell proximal to said bolt, said spoke placed within said slot and substantially biased by said washer when said nut is rotated and biased against said washer.

14. A centrifugal switching device recited in claim 12 whose means for transmitting and reflecting said generated light form said light source and reflecting incident light from an external light source comprises a plurality of prism surfaces on said inner surfaces of said reflector housing, said plurality of prism surfaces causing said reflector housing to be translucent for said generated light from within said housing and substantially reflective for said external light incident upon said reflector housing.

15. A centrifugal switching device recited in claim 11 whose means for mounting said circuit board within said chamber comprises a bolt passing through a hole cut in said circuit board, said circuit board held on said bolt between said reflector shells.

16. A centrifugal switching device recited in claim 11 whose means for sealing said first and second housing shells comprise a seal seated within a groove around a perimeter of said reflector housing shells, said seal compressed by forcing said shells against said seal, biasing said shells against said seal using a nut and bolt about each of said shells.

17. A portable light and reflector recited in claim 11 whose battery is a lithium battery.

18. A portable light and reflector suitable for mounting on a bicycle or similar vehicle, comprising:
   a reflector housing having a first shell and a second shell, said shells, further comprising:
      a substantially flat left side face and a substantially flat right side face;
      a center section between said right side face and said left side face formed by two inclined planes creating an outside peak and forming a pocket on an inside surface, a triangular shaped vertical section is formed on each side of said inclined planes to form said shell, said triangular sections are substantially transparent to light;
      means for sealing said first and second shells to form a substantially water tight chamber within said housing; and
      means for fastening said first and second housing shells to each other and to a spoke of a bicycle wheel; and
   a light emitting diode having a first contact and a second contact;
   a battery having a first terminal and a second terminal;
   a centrifugal switch further comprising:
      an elongated flexible metal arm having a proximal end and a distal end;
      a weight affixed to said distal end;
      a circuit board mounted within said reflector chamber on said bolt, said circuit board having said proximal end of said elongated arm affixed thereto; and
      a contact post affixed to said circuit board proximate to said distal end of said elongated arm, said contact post of said switch electrically connected to said second contact of said light emitting diode;
   a battery clip affixing said battery to said circuit board;
   a first conductive path affixed on said circuit board for connecting said first terminal of said battery to said first contact of said light source;
   a second conductive path for electrically connecting said second terminal of said battery to said proximal end of said centrifugal switch elongated arm; and
   a plurality of prism surfaces located on inside surfaces of said left side face, right side face and said center inclined plane sections so as to transmit light through said surfaces generated from said light emitting diode and reflect external light incident upon said reflector from external light sources.

19. A portable light and reflector recited in claim 18 whose light emitting diode is an intermittently flashing light emitting diode.

20. A method of transmitting and reflecting light from a portable light and reflector suitable for mounting on a bicycle or similar device, comprising the steps of:
   providing a reflector housing having a first shell and a second shell, further comprising the steps of:
      providing a substantially flat left side face and a substantially flat right side face;
      providing a center section between said right side face and said left side face and forming two inclined planes creating an outside peak and forming a pocket on an inside surface, forming a triangular shaped vertical section on each side of said inclined planes and forming said shell, providing said triangular sections substantially transparent to light;
      interposing a seal seated within a groove around a perimeter of said first shell;
      inserting a bolt through said shells for aligning said shells and said seal between said first shell and said second shell;
      fastening a nut to said bolt biasing said shells against said seal for compressing seal and forming a water tight chamber; and
      placing a washer between said nut and a slot in said first shell for biasing said washer and reflector housing against a spoke of a bicycle wheel between an axle and a rim of said bicycle wheel;
   providing a light emitting diode having a first contact and a second contact;
   providing a battery having a first terminal and a second terminal;
   providing a centrifugal switch, further comprising the steps of:
      affixing an elongated flexible metal arm having a proximal end and a distal end;
      affixing a weight to said distal end;
      mounting a circuit board within said reflector chamber on said bolt, said circuit board having said proximal end of said elongated arm affixed thereto; and
      attaching a contact post to said circuit board proximate to said distal end of said elongated arm, said contact post of said switch electrically connected to said second contact of said light emitting diode;
   attaching a battery clip said battery to said circuit board;
   affixing a first conductive path onto said circuit board for connecting said first terminal of said battery to said first contact of said light source;
   affixing a second conductive path for electrically connecting said second terminal of said battery to said proximal end of said centrifugal switch elongated arm;

forming a plurality of prism surfaces located on inside surfaces of said left side face, right side face and said center inclined plane sections so as to transmit light through said surfaces generated from said light emitting diode and reflect external light incident upon said reflector from external light sources;

rotating said bicycle wheel for exerting a centrifugal force onto said elongated arm weighted distal end;

closing a circuit between said battery and said light emitting diode;

emitting light through said faces of reflector housing and through said transparent triangular shaped vertical section onto said reflective outer surface of left and right side faces of said reflector housing; and reflecting incident light reflecting from said reflective outer surfaces of reflector housing.

* * * * *